United States Patent [19]
Knapp

[11] Patent Number: 5,477,885
[45] Date of Patent: Dec. 26, 1995

[54] FLOW RATE AND TEMPERATURE LIMITING MECHANISM FOR A MIXING VALVE

[75] Inventor: Alfons Knapp, Biberach, Germany

[73] Assignee: Masco Corporation, Taylor, Mich.

[21] Appl. No.: 244,477

[22] PCT Filed: Jul. 17, 1992

[86] PCT No.: PCT/US92/05977

§ 371 Date: May 26, 1994

§ 102(e) Date: May 26, 1994

[87] PCT Pub. No.: WO93/11382

PCT Pub. Date: Jun. 10, 1993

[30] Foreign Application Priority Data

Nov. 29, 1991 [IT] Italy .................................. TO91A0925

[51] Int. Cl.[6] ............................................... F16K 11/076
[52] U.S. Cl. ...................... 137/625.41; 251/285; 251/288
[58] Field of Search .......................... 137/625.17, 625.4, 137/625.41; 251/285, 288

[56] References Cited

U.S. PATENT DOCUMENTS

| | | | |
|---|---|---|---|
| 1,299,586 | 4/1919 | Leibing | 137/625.41 X |
| 3,417,783 | 5/1965 | Manoogian et al. | 137/625.41 |
| 3,433,264 | 3/1969 | Parkison | 137/625.17 |
| 3,526,250 | 9/1970 | Miller | 137/625.4 |
| 3,872,890 | 3/1975 | Hare | 137/625.41 |
| 3,915,195 | 10/1975 | Manoogian et al. | 137/625.41 |
| 4,325,403 | 4/1982 | Uhlmann | 137/165.17 X |
| 4,449,551 | 5/1984 | Lorch | 137/625.41 |
| 4,458,839 | 7/1984 | MacDonald | 236/12.16 |
| 4,915,295 | 4/1990 | Pullen et al. | 236/12.16 |
| 4,941,509 | 7/1990 | Orlandi | 137/625.17 |
| 4,981,156 | 1/1991 | Nichlas et al. | 132/270 |

FOREIGN PATENT DOCUMENTS

2705165  9/1977  Germany.

Primary Examiner—John Rivell
Attorney, Agent, or Firm—Reising, Ethington, Barnard & Perry

[57] ABSTRACT

A mixing valve (10) has a limiting mechanism (26) for controlling the maximum flow rate and maximum temperature mix of the mixed water. The limiting mechanism (26) includes a rotatable plate member (70) retains on a cap assembly (56) by a positioning ring member (82). The plate member (70) has a slot (74) that receives a control stem (22) of valve element (20). A handle (90) has a leg section (96) that fits onto control stem (22) and has a cross-sectional shape that prevents the handle from rotating about the control stem axis. The positioning ring has a projection (88) that limits the rotation of the plate member (70) to define a maximum temperature mix of the discharged water through outlet port (30) of the mixing valve (10).

26 Claims, 3 Drawing Sheets

FLOW RATE AND TEMPERATURE LIMITING MECHANISM FOR A MIXING VALVE

TECHNICAL FIELD

The field of this invention relates to a faucet mixing valve and more particularly to a volume and temperature limit device for a mixing valve.

BACKGROUND OF THE DISCLOSURE

Single handle faucets, commonly referred to as mixer valves, that control the flow of both hot and cold water have seen vast consumer acceptance. The faucets are commonly constructed such that a handle or knob is movable in two distinct direction to adjust the mix of hot and cold water and to adjust the volume or flow rate.

The two basic types of mixer valves that have seen widest commercial acceptance are plate valves and ball valves. Ball valves are renowned for reliable and durable one piece valve construction that is easily assembled. Plate valves on the other hand offer a drive mechanism that allows motion of the handle in two distinct directions that has found widest commercial acceptance. This desirable handle motion allows for an orbiting motion of the handle about a fixed axis of the valve body and a rocking, i.e. pivoting motion about a axis that moves with respect to the valve housing as the handle orbits about the fixed axis. The moving axis is perpendicular to the fixed axis of the valve housing. A characteristic of this type of handle motion is that when the handle is pivoted to an off position, the mix ratio of hot and cold water can be remembered by the location of the handle so that when the faucet is turned back on, one has the option of obtaining the same mix of hot and cold water flows through the faucet.

Recently, ball valves have been devised that allow the handle to be operated in the same fashion as the above described plate type mixer valves. The system is disclosed in U.S. Pat. No. 4,449,551 issued to Lorch on May 22, 1984. Another system is disclosed in PCT application PCT/US91/07816 filed on Oct. 22, 1991 by the present applicant and is incorporated herein by reference.

Most plate type and ball type mixing valves have a control stem extending out from the valve housing and connectable to a handle to control the position of the valve. The extent of motion for controlling the maximum amount of flow and the maximum temperature of the water is commonly defined by the shape of the opening or by structures placed under an adjustment ring screwed into the cap member to tighten the valve assembly against leakage. The internal position of the volume and temperature limiters renders them difficult to change. Repair or replacement of the limit structures requires that the main water line be shut off from the valve. Often, the volume and temperature limiters are built into the guide mechanism of the valve itself which therefore requires the elements to be structurally resistant against any torquing forces not in the direction of motion of the handle. These forces are commonly referred to as lateral forces.

A limiting disc has been mounted in the valve housing for limited rotation about an axis of the housing. The disc has a slot through which a control stem extends. The control stem has a rectangular cross-section. The rectangular control stem engages two opposing edges of the slot to prevent relative rotation of the stem with the slot. In this manner, the limited rotation of the disc corresponds to the extent of rotation of the stem about the axis of the valve housing. The length of the slot limits the stems extent of rocking motion about a transverse axis. The need for a rectangular cross-sectioned stem increases the cost as compared with a standard circular cross-sectioned stem. Secondly, the rectangular shape provides larger dimensions of the stem a compared to a cylindrical stem and therefore hinders the reduction of the general dimensions of the faucet mixing valve housing. Thirdly, significant technological difficulties exist to have the rectangular control stem made integral with the ball valve. The rectangular control stem must be precisely oriented onto the ball valve element. A small angular discrepancy provides for a significant change in temperature control.

What is needed is a volume and temperature limiting device that can be applied to the exterior of the valve housing. Furthermore what is needed is a limiter device that is independent from the guide mechanism of the mixing valve faucet to provide for a system which can easily allow replacement of limiting elements for changing the volume and temperature field of the mixing valve without disassembly of the valve housing. It is further desired to have a limiter device that can be incorporated onto a cylindrical control stem of a faucet mixing valve.

SUMMARY OF THE DISCLOSURE

In accordance with one aspect of the invention, a mixer valve for a faucet has a ball valve pivotably mounted in a valve receiving cavity of a housing. The housing has a plurality of ports in fluid communication with the cavity and the ball valve has a plurality of openings in an outer at least partially spherical valve surface. The openings cooperate with the ports to control water flow through the ports. The valve has a control opening therethrough with an axis of the valve housing passing through the control opening. The ball valve has a control stem extending therefrom and through the control opening with the ball valve being mounted for rotation about the axis of the valve housing and about an axis of the ball valve that is perpendicular to the axis of the housing. The valve housing includes a cap for retaining the ball valve in the valve cavity with the control opening extending through the cap. A limiting plate member is mounted to an exterior portion of the housing in proximity to the cap and has an elongated slot therethrough with a pair of opposing long edges and a pair of end edges defining the slot. The limiting plate member is mounted for limited rotational motion about the axis of the valve housing. The elongated slot is sized to receive the control stem. A positioner element is affixed to an exterior surface of the housing for retaining the plate member at its operable rotatable position on the housing with the control stem extending therethrough.

A limiter element is fixedly attached to the control stem and passes into the slot. The limiter element has peripheral abutment surfaces for engagement to the edges of the slot for limiting the extent of rotational motion of said stem about its longitudinal axis within the slot and for limiting the extent of rocking motion of the stem about an axis orthogonal to both the longitudinal axis of the stem and a longitudinal axis of the slot.

Preferably, the limiter element is integrally formed with a handle that is mounted onto the control stem. In one embodiment, the handle includes a cap section sized to cover and conceal the opening in the valve housing, the limiting plate member, the retaining ring, the limiter element, and the control stem. The limiter element preferably has an inclined lower surface that facilitates its insertion into the elongated slot of the limiting plate member. The limiter element has an outer periphery that is substantially rectangular in cross-section. The limiter element preferably has its control stem receiving hole being asymmetrically positioned therein. In one embodiment, the control stem has a substantially circular cross-section.

Preferably, the limiting plate member has a limited degree of rotation about the axis of the housing. The positioner element includes a ring member. The cap includes an adjustment ring which has the ring member mounted at its outer end. The limiting plate member and the ring member having complementary abutting edge surfaces that limit the rotation of the limiting plate member. The opposing long edges having two parallel flanges extending transverse to the general plane of the plate member with at least one flange engageable to a projection extending from the ring member to limit the rotation of the limiting plate member. The projection extends radially inwardly from the ring member.

BRIEF DESCRIPTION OF THE DRAWINGS

Reference now is made to the accompanying drawings in which.

DETAILED DESCRIPTION OF THE PREFERRED EMBODIMENT

Referring now to the figures, a mixing valve 10 has a conventional valve housing 12 that is formed from a base member 14 and a cover 16. A mixing valve element 20 with a control stem 22 extends through an opening 24 in the cover 16. A limiting mechanism 26 is positioned to the exterior of the housing 12 to limit the flow rate and temperature mix of the water flowing through the valve 10.

Figures 1, 3:
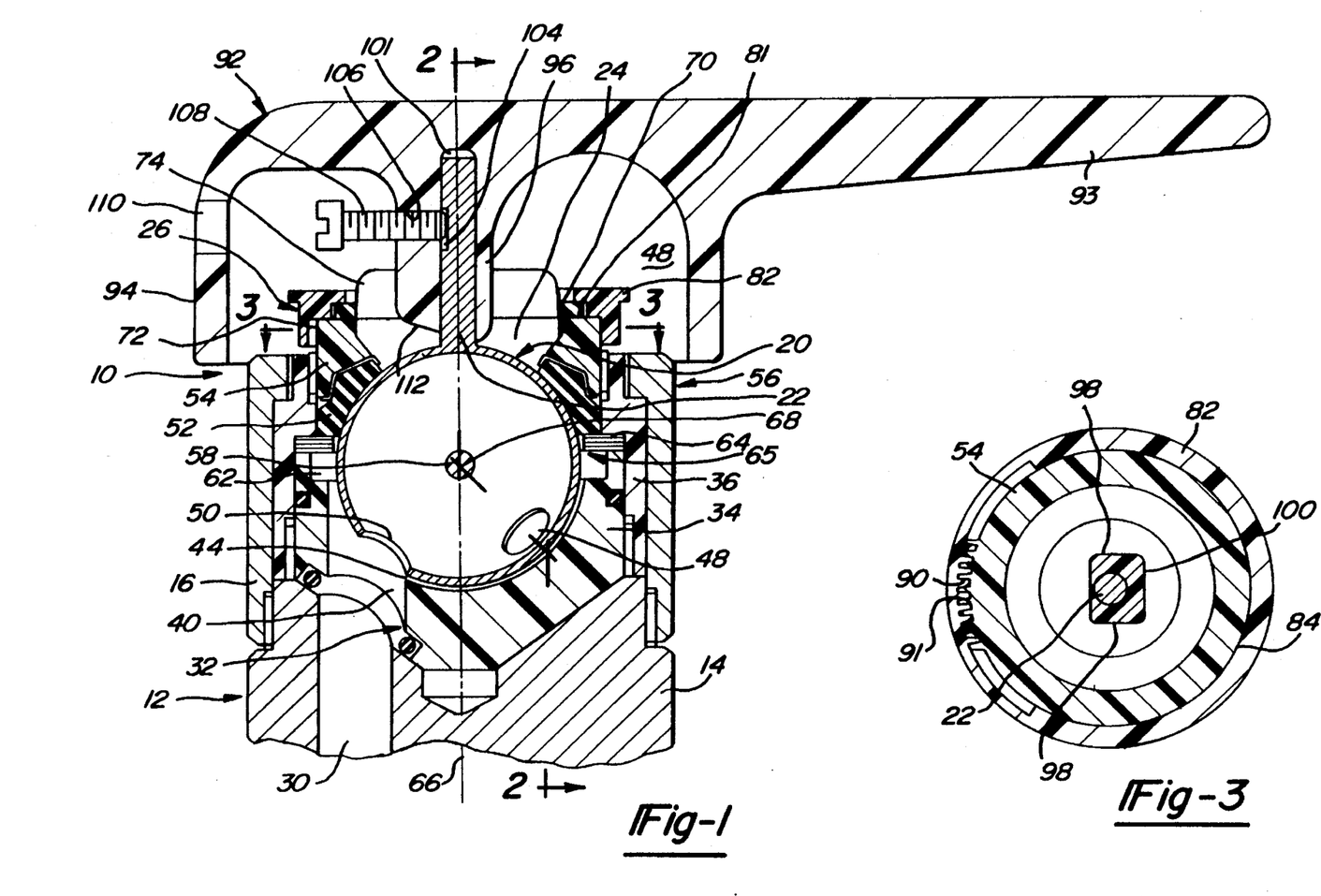
FIG. 1 is a side elevational and segmented view of a faucet mixer valve according to one embodiment of the invention.
FIG. 3 is a cross-sectional view taken along lines 3—3 shown in FIG. 1.
Figure 2:
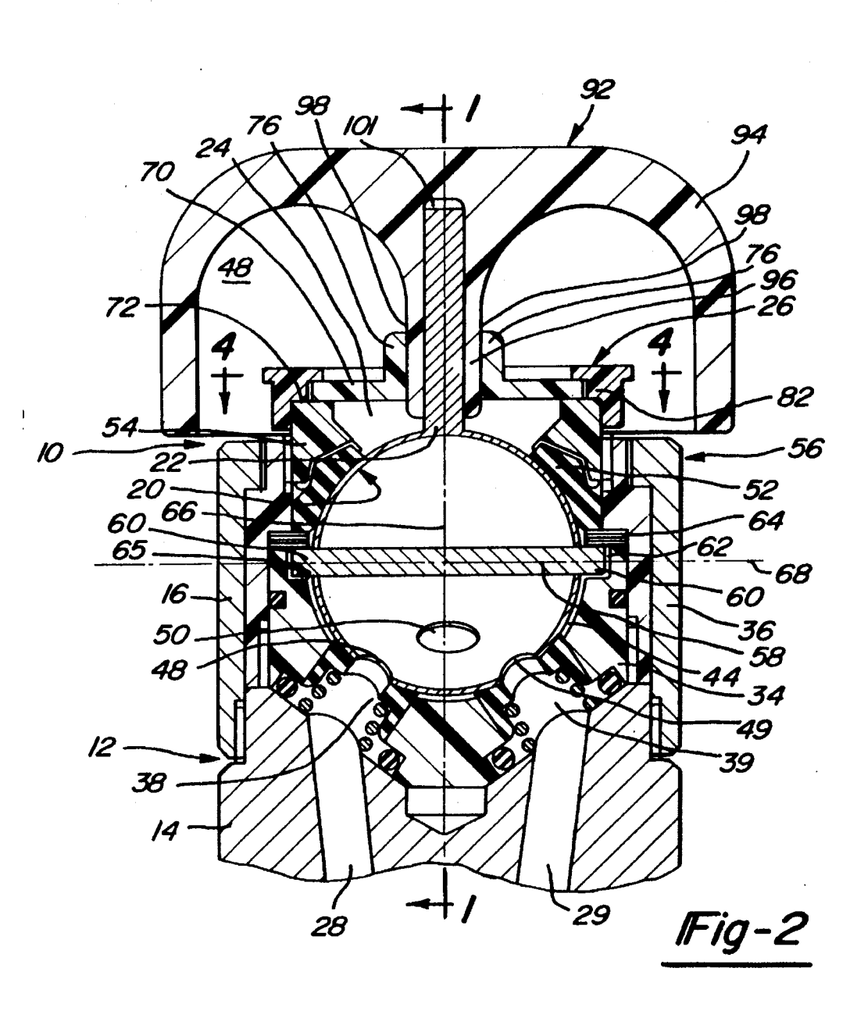
FIG. 2 is a cross-sectional view taken along lines 2—2 shown in FIG. 1.

More particularly, as shown in FIGS. 1 and 2, the base member 14 has two inlet ports 28 and 29 for hot and cold water and an outlet port 30 for the passage of mixed water. The illustrated mixing valve 10 is a cartridge type having a cartridge housing 32 fitted within the housing 12. The cartridge housing 32 includes a lower body member 34 and upper body member 36 that are fitted together in a known fashion. The lower body member 34 has two inlet passages 38 and 39 housing sealing assemblies 42 and aligned with inlet ports 28 and 29. An outlet passage 40 is aligned with outlet port 30.

The cartridge housing 32 defines a cavity 44 shaped to receive the valve element 20. The illustrated valve element 20 is commonly referred to as a ball valve. The ball valve 20 is seated in cavity 44 that is substantially spherical. The ball valve 20 has ports 48, 49 and 50 that functionally cooperate with passages 38, 39 and 40 to control flow rate and temperature of water passing to outlet port 30. A sealing gasket 52 is sealingly interposed between an upper part of the ball valve 20 and cartridge upper body member 36 to prevent leakage of water from the mixing valve 10 to the exterior 48 about the housing 12. An adjustment ring 54 is threadably engaged to the upper body member 36 of the cartridge housing 32 and biases the gasket 52 against the ball valve 20. The cover 16, upper body member 36, and adjustment ring 54 can collectively be referred to as a cap assembly 56 for the housing 12. It is also appreciated that the ball valve 20 may be mounted directly in housing 12 without a cartridge housing 32. Cap assembly 56 may be a single integrally formed member.

The ball valve 20 has a pin 58 extending therethrough with distal ends 60 extending into a slot 62 defined below a guide ring 64 which form a guide mechanism 65. The details of the function of the guide mechanism 65 with pin 58 is explained in PCT application PCT/US91/07816 filed on Oct. 22, 1991 by the present applicant and is incorporated herein by reference. Generally, the guide mechanism 65 allows orbiting motion of the control stem about a fixed vertical axis 66 and rocking motion about a horizontal axis 68 through the pin 58. The axis 68 is movable with respect to the housing 12 but fixed with respect to the ball valve 20. The axis 66 extends through opening 24 and cavity 44 in housing 12. Motion in a direction other that these two prescribed directions is prohibited by the construction of the internal members of the mixing valve 10. The pin 58, guide ring 64, and cartridge lower body member 34 are constructed to be strong enough to resist lateral torquing forces in directions other than the prescribed directions.

Figure 4:
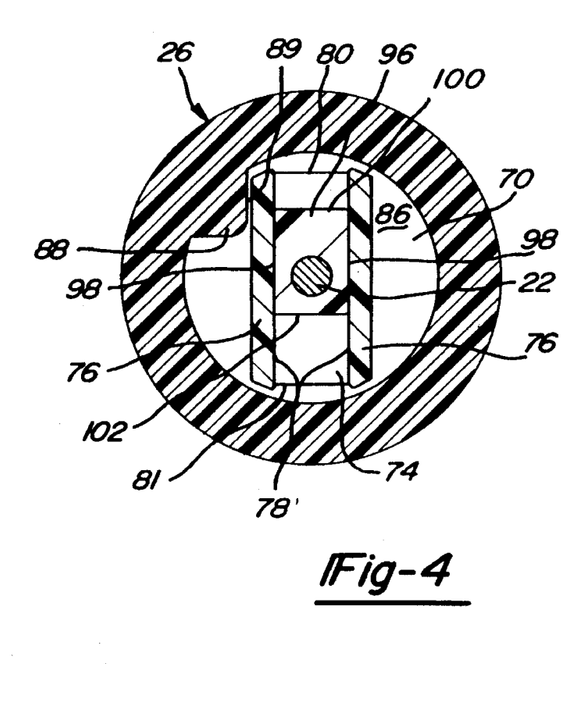
FIG. 4 is a cross-sectional view taken along lines 4—4 shown in FIG. 2.

The limiting mechanism 26 includes a limit plate member or disc 70 that is rotatably mounted on top of the outer end 72 of adjustment ring 54 about vertical axis 66. As shown in FIGS. 1 and 4, the disc 70 has an elongated slot 74 with two upwardly extending flanges 76 defining the longer edges 78 of slot 74 and two opposite end edges 80 and 81. The disc is retained on adjustment ring 54 by a positioning ring 82 that is engaged to an outer periphery 84 of outer end 72 of adjustment ring 54. As best shown in FIG. 4, the positioning ring 82 has a center aperture 86 that allows the limit ring to rotate a limited amount. The ring 82 has a radially inwardly extending projection 88 that has an edge 89 which can abut at least one flange 76 to provide a stop toward the full hot position to define the maximum temperature mix position.

Furthermore, the position of projection 88 can be rotatably adjusted by repositioning ring 82 onto the outer periphery 84. As best shown in FIG. 3, the outer periphery has an externally splined section 91 that engages an internally splined section 90 of ring 82. The adjustment of the ring 82 varies the amount of rotation of the disc 70 and ball valve 20 between a full cold position defined by guide mechanism 65 and a full hot position.

An operating handle 92 is affixed to control stem 22 to operate the ball valve 20. The handle 92 has a lever section 93, cap section 94 and a leg section 96 that connects to stem 22. The leg section 96 has a substantially rectangular outer cross-section sized to fit within slot 74 with two sides 98 slidably abutting edges 78. A side 100 is engageable to end edge 80. The leg section 96 has a circular hole 101 asymmetrically placed between sides 100 and 102 and sized to receive stem 22 that is generally cylindrical in shape.

The stem 22 may have a flat 104 machined therein that is aligned with a threaded aperture 106 in leg section 96 that receives set screw 108. Cap section 94 may have an access hole 110 to facilitate operation of set screw 10. Alternately to the flat 104, the stem 22 may have a splined upper section which engages an internally splined section in hole 101.

When a splined connection is used, the rotational orientation of the flat 104 during machining is eliminated. Correct orientation of the handle 92 is accomplished during assembly onto stem 22.

It can be seen that the spacing of side 100 from stem 22 controls the amount of rocking motion that can exist from the off position that is defined by the internal guide mechanism 65 to an open position. The abutment of side 100 against end edge 80 defines the maximum flow rate position. The maximum flow rate may also be adjusted by replacement of the handle with another that has its side 100 spaced a different amount from the stem 22.

The lower surface 112 of leg section 96 is inclined to facilitate insertion of the leg section 96 into the slot 74. This inclined surface 112 is particularly useful where the leg section 96 and slot 74 are partially or fully concealed when the leg section 96 is positioned on stem 22. This concealment occurs when the cap section 94 is sized and shaped to cover and conceal the top end of cap assembly 56 as illustrated in FIGS. 1 and 2. When cap assembly 56 has its top end concealed, it should be understood that the opening 24 through the cap assembly 56, the plate member 70 with its slot 74, and positioning ring 82 is also concealed under the cap section 94. The control stem 22 and the leg section 96 are also concealed by the cap section 94.

The leg section 96 has been described as being integral with respect to the handle 90. The leg section 96 may be a separate member attached to the handle 90 or attached in a separate fashion to the control stem 22 independent of handle 90. The leg section 96 demands a cross-sectional shape that limits rotation within slot 74 but does not place any other constraints on the configurations of the handle 90.

The use of the limiting mechanism 26 allows ease of repair and replacement. Only the handle needs to be removed from the control stem in order to repair or replace the limiting mechanism 26. Because the cap assembly 56 is not removed and gasket 52 remains undisturbed, the limiting mechanism may be repaired or replaced without turning off the water supply to the mixing valve 10. The ring 82 and disc 70 may be constructed to only resist torque exerted by the leg section 96 in the two directions of motion of the leg section 96 where leg section 96 abuts edge 80 of side flange 76. Torque forces exerted in other directions are resisted by guide mechanism 65 within mixing valve 10.

Adjustment of the maximum temperature mix may not be necessary or desired in certain applications. In this situation, the positioning ring 82 may be integrally formed with the adjustment ring 54 thereby eliminating a part in the mixing valve assembly 10.

The ring 82 and disc 70 may be constructed strong enough in certain applications that it may function as a substitute guide mechanism. The guide mechanism 65 may be dispensed with because the limiting mechanism 26 also restrains the motion of the stem 22 in the two proscribed directions.

Figures 5, 6, 7:
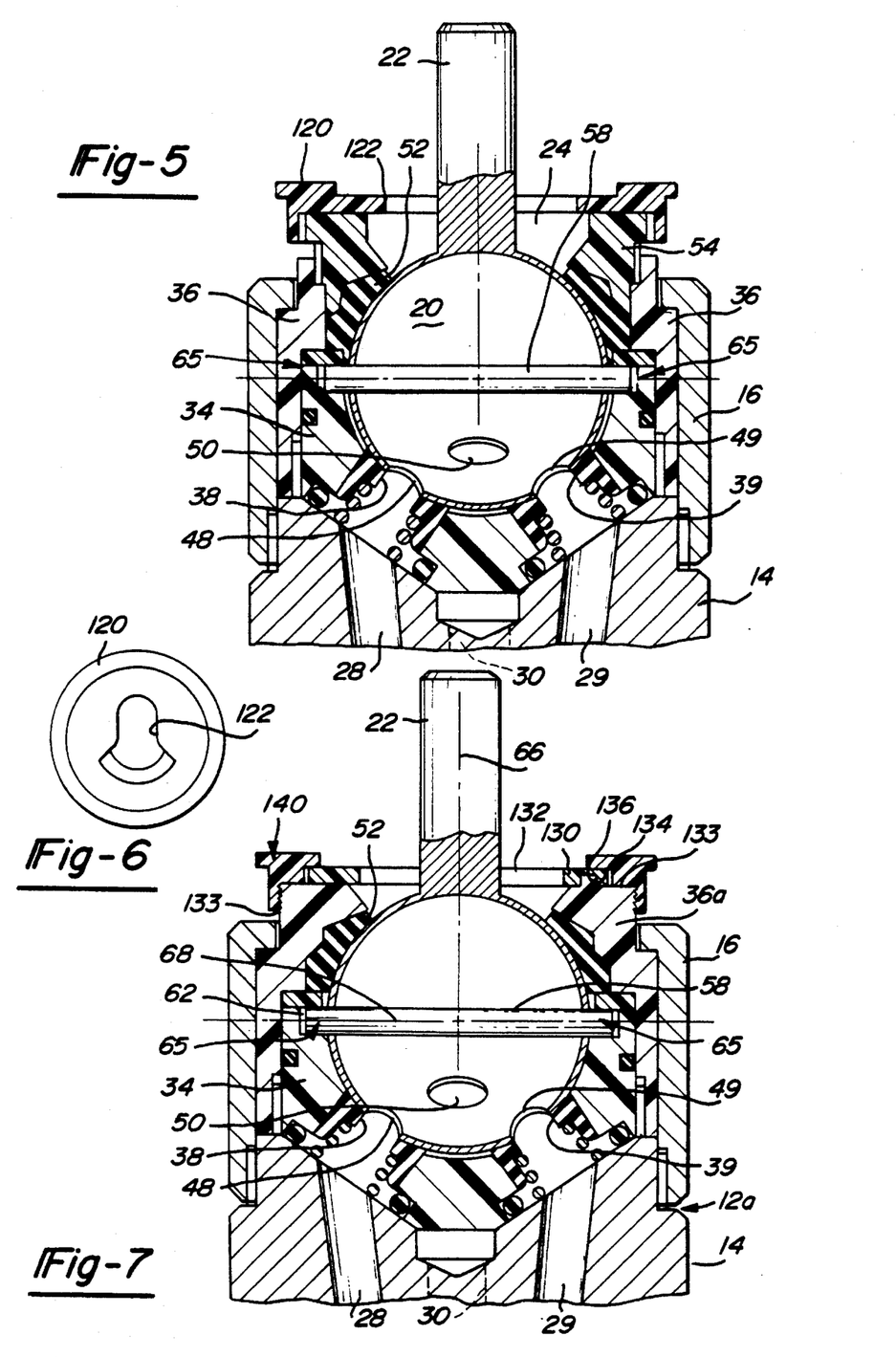
FIG. 5 is a side elevational and segmented view of a second embodiment according to the invention.
FIG. 6 is a top plan view of the limiter element illustration in FIG. 5.
FIG. 7 is a side elevational view of a third embodiment according to the invention.

A second embodiment is disclosed in FIGS. 5 and 6. In this embodiment, a single piece limiter element 120 is splined fitted onto the top exterior end of adjustment ring 54. The limiter element 120 has a contoured aperture 122 that defines the limits in temperature and volume for the motion of stem 22. The stem 22 in this embodiment does not need a leg section 96 from handle 92 to correctly operate. This limiter element 120 must be used with guide mechanism 65 or an equivalent.

Adjustment of the maximum temperature mix and or the volume maximum is accomplished by replacing the limiter element 120 with another having an aperture 122 with a different contour. The replacement of the element 120 is easily obtained by removal of the handle. The interior or the seals of the mixing valve 10 are not disturbed. In this fashion the temperature field and volume field can be changed without the need to shut off the supply of the water to the mixing valve.

A third embodiment is shown in FIG. 7 which discloses the limiter element 130 keyed directly onto the upper end 133 of the upper cartridge body member 36a. The limiter element 130 has a notch 134 which receives a protrusion 136 extending from upper cartridge body member 36a. The limiter element 130 is rotationally fixed with respect to the housing 12a. The limiter element 130 has a contoured aperture 132 similar to aperture 122. A positioning ring 140 is threadably fastened to the upper end 133 of the upper body member 36a to retain the element 130 securely in position. The stem 22 in this embodiment does not need a leg section 96 from handle 92 to correctly operate. This limiter element 130 must be used with guide mechanism 65 or an equivalent.

The fields of temperature and volume control may be adjusted by merely removing the handle, unscrewing the ring 140 and replacing the limiter element 130 with one having an aperture 132 with a different contour. The interior or the seals of the mixing valve 10 are not disturbed. In this fashion the temperature field and volume field can be changed without the need to shut off the supply of the water to the mixing valve.

It should be understood that while a ball valve 20 is illustrated, the invention can also be advantageously in mixing valves that have a valve element of a different construction and configuration.

Variations and modifications are possible without departing from the scope and spirit of the present invention as defined by the appended claims.

The embodiments in which an exclusive property or privilege is claimed are defined as follows:

1. In a faucet mixing valve having a housing with a valve chamber, a first and second supply inlet and a supply outlet in communication with said valve chamber, a mixing valve element operably mounted in said valve chamber and a control stem extending from said valve element through an opening in said housing; the improvement characterized by;

a limiting plate member having an elongated slot therethrough with a pair of opposing long edges and a pair of end edges defining said slot;

said elongated slot sized to receive said control stem;

positioning means for positioning said plate member with respect to said housing with said control stem extending therethrough;

a limiter element removably and fixedly attached to said control stem and passing into said slot, said limiter element having peripheral abutment surfaces for engagement to said edges defining said slot for limiting the extent of rotational motion of said stem about its longitudinal axis within said slot and for limiting the extent of rocking motion of said stem about an axis orthogonal to both said longitudinal axis of said stem and a longitudinal axis of said slot; and said limiter element being integrally and simultaneously formed with a handle as a one-piece member that is mounted onto said control stem.

2. In a faucet mixing valve as defined in claim 1 further characterized by:

said limiter element has an outer periphery which is substantially rectangular in cross-section along a plane transverse to the longitudinal axis of said stem.

3. In a faucet mixing valve as defined in claim 2 further characterized by:

said handle includes a cap section sized to cover and conceal said opening in said valve housing, said limiting plate member, said positioning means, said limiter element, and said control stem.

4. In a faucet mixing valve as defined in claim 3 further characterized by:

said limiter element having an inclined lower surface that facilitates its insertion into the elongated slot of the limiting plate member.

5. In a faucet mixing valve as defined in claim 1 further characterized by:

said limiter element has an outer periphery that is substantially rectangular in cross-section along a plane stransverse to a longitudinal axis of said stem and sized to slideably abut the side edges of said slot to substantially prevent any substantial rotation of said control stem relative to said slot about the longitudinal axis of said control stem.

6. In a faucet mixing valve as defined in claim 5 further characterized by:

said limiter element has a control stem receiving hole being asymmetrically positioned in said limiter element.

7. In a faucet mixing valve as defined in claim 5 further characterized by:

said control stem has a substantially circular cross-section.

8. In a faucet mixing valve as defined in claim 1 further characterized by:

said limiting plate member having a limited degree of rotation about a fixed axis with respect to said housing that extends through said valve chamber for allowing simultaneous rotation of said control stem and said limiting plate member about said fixed axis, and said positioning means includes a positioning ring member.

9. In a faucet mixing valve as defined in claim 8 further characterized by:

said limiting plate member and said ring member having complementary abutting edge surfaces that limit the rotation of said limiting plate member.

10. In a faucet mixing valve as defined in claim 9 further characterized by:

said opposing long edges having two parallel flanges extending transverse to the general plane of said plate member with at least one flange engageable to a projection extending from said ring member to limit the rotation of said limiting plate member.

11. In a faucet mixing valve as defined in claim 10 further characterized by:

said projection extending radially inwardly from the ring member.

12. In a mixer valve for a faucet having a ball valve pivotably mounted in a valve receiving cavity of a housing, said housing having a plurality of ports in fluid communication with said cavity, said ball valve having a plurality of openings in an outer at least partially spherical valve surface, said openings cooperating with said ports to control water flow through said ports, said valve having a control opening therethrough with an axis of said valve housing passing through said control opening, said ball valve having a control stem extending therefrom and through said control opening with said ball valve being mounted for rotation about said axis of said valve housing and about an axis of said ball valve that is perpendicular to said axis of said housing, said valve housing includes a cap for retaining said ball valve in said valve cavity with said control opening extending through the cap, the improvement characterized by;

a limiting plate member mounted to an exterior portion of said housing in proximity to said cap and having an elongated slot therethrough with a pair of opposing long edges and a pair of end edges defining said slot, said limiting plate member mounted for limited rotational motion about said axis of said valve housing;

said elongated slot sized to receive said control stem;

a positioning means affixable to an exterior surface of said housing for retaining said plate member in its operable rotatable position on said housing with said control stem extending therethrough;

a limiter element removably and fixedly attached to said control stem and passing into said slot, said limiter element having peripheral abutment surfaces for engagement to said edges defining said slot for precluding substantive rotational motion of said stem about its longitudinal axis within said slot and for limiting the extent of rocking motion of said stem about an axis orthogonal to both said longitudinal axis of said stem and a longitudinal axis of said slot; and said limiter element has an outer periphery that is substantially rectangular in cross-section along a plane that is substantially transverse to the longitudinal axis of the stem with sides slidebly abutting said edges along an extent thereof of said slot to preclude substantive rotational motion of said stem about its longitudinal axis within said slot.

13. In a faucet mixing valve as defined in claim 12 further characterized by:

said control stem has a substantially circular cross-section.

14. In a mixer valve for a faucet having a ball valve pivotably mounted in a valve receiving cavity of a housing, said housing having a plurality of ports in fluid communication with said cavity, said ball valve having a plurality of openings in an outer at least partially spherical valve surface, said openings cooperating with said ports to control water flow through said ports, said valve having a control opening therethrough with an axis of said valve housing passing through said control opening, said ball valve having a control stem extending therefrom and through said control opening with said ball valve being mounted for rotation about said axis of said valve housing and about an axis of said ball valve that is perpendicular to said axis of said housing, said valve housing includes a cap for retaining said ball valve in said valve cavity with said control opening extending through the cap, the improvement characterized by;

a limiting plate member mounted to an exterior portion of said housing in proximity to said cap and having an elongated slot therethrough with a pair of opposing long edges and a pair of end edges defining said slot, said limiting plate member mounted for limited rotational motion about said axis of said valve housing;

said elongated slot sized to receive said control stem;

a positioning means affixable to an exterior surface of said housing for retaining said plate member in its operable rotatable position on said housing with said control stem extending therethrough;

a limiter element removably and fixedly attached to said control stem and passing into said slot, said limiter element having peripheral abutment surfaces for engagement to said edges defining said slot for limiting the extent of rotational motion of said stem about its longitudinal axis within said slot and for limiting the extent of rocking motion of said stem about an axis orthogonal to both said longitudinal axis of said stem and a longitudinal axis of said slot; and said limiter element being integrally formed with a handle that is mounted onto said control stem.

15. In a faucet mixing valve as defined in claim 14 further characterized by:

said handle includes a cap section sized to cover and conceal said opening in said valve housing, said limiting plate member, said positioning means, said limiter element, and the control stem.

16. In a faucet mixing valve as defined in claim 15 further characterized by:

said limiter element having an inclined lower surface that facilitates its insertion into the elongated slot of the limiting plate member.

17. In a mixer valve for a faucet having a ball valve pivotably mounted in a valve receiving cavity of a housing, said housing having a plurality of ports in fluid communication with said cavity, said ball valve having a plurality of openings in an outer at least partially spherical valve surface, said openings cooperating with said ports to control water flow through said ports, said valve having a control opening therethrough with an axis of said valve housing passing through said control opening, said ball valve having a control stem extending therefrom and through said control opening with said ball valve being mounted for rotation about said axis of said valve housing and about an axis of said ball valve that is perpendicular to said axis of said housing, said valve housing includes a cap for retaining said ball valve in said valve cavity with said control opening extending through the cap, the improvement characterized by;

a limiting plate member mounted to an exterior portion of said housing in proximity to said cap and having an elongated slot therethrough with a pair of opposing long edges and a pair of end edges defining said slot, said limiting plate member mounted for limited rotational motion about said axis of said valve housing;

said elongated slot sized to receive said control stem;

a positioning means affixable to an exterior surface of said housing for retaining said plate member in its operable rotatable position on said housing with said control stem extending therethrough;

a limiter element removably and fixedly attached to said control stem and passing into said slot, said limiter element having peripheral abutment surfaces for engagement to said edges defining said slot for limiting the extent of rotational motion of said stem about its longitudinal axis within said slot and for limiting the extent of rocking motion of said stem about an axis orthogonal to both said longitudinal axis of said stem and a longitudinal axis of said slot; and said limiter element has a control stem receiving hole being asymmetrically positioned in said limiter element.

18. In a mixer valve for a faucet having a ball valve pivotably mounted in a valve receiving cavity of a housing, said housing having a plurality of ports in fluid communication with said cavity, said ball valve having a plurality of openings in an outer at least partially spherical valve surface, said openings cooperating with said ports to control water flow through said ports, said valve having a control opening therethrough with an axis of said valve housing passing through said control opening, said ball valve having a control stem extending therefrom and through said control opening with said ball valve being mounted for rotation about said axis of said valve housing and about an axis of said ball valve that is perpendicular to said axis of said housing said valve housing includes a cap for retaining said ball valve in said valve cavity with said control opening extending through the cap, the improvement characterized by;

a limiting plate member mounted to an exterior portion of said housing in proximity to said cap and having an elongated slot therethrough with a pair of opposing long edges and a pair of end edges defining said slot, said limiting plate member mounted for limited rotational motion about said axis of said valve housing;

said elongated slot sized to receive said control stem;

a positioning means affixable to an exterior surface of said housing for retaining said plate member in its operable rotatable position on said housing with said control stem extending therethrough;

a limiter element removably and fixedly attached to said control stem and passing into said slot, said limiter element having peripheral abutment surfaces for engagement to said edges defining said slot for limiting the extent of rotational motion of said stem about its longitudinal axis within said slot and for limiting the extent of rocking motion of said stem about an axis orthogonal to both said longitudinal axis of said stem and a longitudinal axis of said slot;

said limiting plate member having a limited degree of rotation about said axis of said housing and said positioning means includes a ring member;

said limiting plate member and said ring member having complementary abutting edge surfaces that limit the rotation of said limiting plate member; and said ring member being adjustably mounted about said axis of said housing for varying the amount of rotation of said limiting plate member.

19. In a mixer valve for a faucet having a ball valve pivotably mounted in a valve receiving cavity of a housing, said housing having a plurality of ports in fluid communication with said cavity, said ball valve having a plurality of openings in an outer at least partially spherical valve surface, said openings cooperating with said ports to control water flow through said ports, said valve having a control opening therethrough with an axis of said valve housing passing through said control opening, said ball valve having a control stem extending therefrom and through said control opening with said ball valve being mounted for rotation about said axis of said valve housing and about an axis of said ball valve that is perpendicular to said axis of said housing, said valve housing includes a cap for retaining said ball valve in said valve cavity with said control opening extending through the cap, the improvement characterized by;

a limiting plate member mounted to an exterior portion of said housing in proximity to said cap and having an elongated slot therethrough with a pair of opposing long edges and a pair of end edges defining said slot, said limiting plate member mounted for limited rotational motion about said axis of said valve housing;

said elongated slot sized to receive said control stem;

a positioning means affixable to an exterior surface of said housing for retaining said plate member in its operable rotatable position on said housing with said control stem extending therethrough;

a limiter element removably and fixedly attached to said control stem and passing into said slot, said limiter element having peripheral abutment surfaces for engagement to said edges defining said slot for limiting the extent of rotational motion of said stem about its longitudinal axis within said slot and for limiting the extent of rocking motion of said stem about an axis orthogonal to both said longitudinal axis of said stem and a longitudinal axis of said slot;

said limiting plate member and a ring member having complementary abutting edge surfaces that limit the rotation of said limiting plate member;

said opposing long edges having two parallel flanges extending transverse to the general plane of said plate member with at least one flange engageable to a projection extending from said ring member to limit the rotation of said limiting plate member.

20. In a faucet mixing valve as defined in claim 19 further characterized by:

said projection extending radially inwardly from the ring member.

21. In a faucet mixing valve having a housing with a valve chamber, a first and second supply inlet and a supply outlet in communication with said valve chamber, a mixing valve element operably mounted in said valve chamber, sealing gasket operably engaged between said mixing valve element and an abutment section of said housing circumscribing said valve chamber, and control stem extending from said valve element through an opening in a cap of said housing; the improvement characterized by;

a limiting plate member mounted to an exterior portion of said housing in proximity to cap and having an elongated slot therethrough with a pair of opposing long edges and a pair of end edges defining said slot, said limiting plate member mounted for limited rotational motion about said axis of said valve housing;

said elongated slot sized to receive said control stem;

a positioning means affixable to an exterior surface of said mixing valve for retaining said plate member in its operable rotatable position on said housing with said control stem extending therethrough;

means for engagement to said edges defining said slot for limiting the extent of rotational motion of said stem about its longitudinal axis within said slot and for limiting the extent of rocking motion of said stem about an axis orthogonal to both said longitudinal axis of said stem and a longitudinal axis of said slot;

said limiting plate and positioning means being removable from said exterior section of said housing without disturbing said abutment section of said housing for retaining said sealing gasket between said mixing valve element and said housing and to provide for said mixing valve element to remain operative and installed in said body against water pressure exerted in said first and second supply inlet;

said limiting plate member having a limited degree of rotation about an axis of said housing and said positioning means includes a ring member; and said ring member being adjustably mounted about said axis of said housing for varying the amount of rotation of said limiting plate member.

22. In a mixer valve for a faucet having a ball valve pivotably mounted in a valve receiving cavity of a housing, said housing having a plurality of inlet ports and an outlet port in fluid communication with said cavity, said ball valve having a plurality of openings in an outer at least partially spherical valve surface, said openings cooperating with said ports to control water flow through said ports, said valve having a control opening therethrough with an axis of said valve housing passing through said control opening, said ball valve having a control stem extending therefrom and through said control opening with said ball valve being mounted for rotation about said axis of said valve housing and about an axis of said ball valve that is perpendicular to said axis of said housing for control of temperature and flow of water to said outlet port from said inlet ports, said valve housing includes a cap for retaining said ball valve in said valve cavity with said control opening extending through the cap, the improvement characterized by;

a limiting member affixedly and removeably mounted at a fixed position to an exterior portion of said housing in proximity to said cap and having a contoured aperture therethrough with a peripheral edge defining said aperture;

said aperture sized to receive said control stem and allow lateral motion of said stem in at least two transverse directions within said aperture;

said peripheral edge defining a limit stop for both said flow and maximum temperature mix of said water to said outlet port;

said limiting member being removable from said exterior section of said housing without disturbing said cap for retaining said ball valve in an operable condition in said valve cavity against water pressure exerted in said first and second supply inlet and limiting the ball valve and rotation about said axis of said valve housing and said axis of said ball valve that is perpendicular thereto.

23. In a mixer valve as defined in claim 22 further characterized by;

said peripheral edges defining a limit stop for both said flow and maximum temperature mix of said water to said outlet port.

24. In a mixer valve for a faucet having a ball valve pivotably mounted in a valve receiving cavity of a housing, said housing having a plurality of inlet ports and an outlet port in fluid communication with said cavity, said ball valve having a plurality of openings in an outer at least partially spherical valve surface, said openings cooperating with said ports to control water flow through said ports, said valve having a control opening therethrough with an axis of said valve housing passing through said control opening, said ball valve having a control stem extending therefrom and through said control opening with said ball valve being mounted for rotation about said axis of said valve housing and about an axis of said ball valve that is perpendicular to said axis of said housing for control of temperature and flow of water to said outlet port from said inlet ports, said valve housing includes a cap for retaining said ball valve in said valve cavity with said control opening extending through the cap, the improvement characterized by;

a limiting member affixedly and removeably mounted at a fixed position to an exterior portion of said housing in proximity to said cap and having a contoured aperture therethrough with a peripheral edge defining said aperture;

said aperture sized to receive said control stem and allow lateral motion of said stem in at least two transverse directions within said aperture;

said peripheral edges of said aperture defining a limit stop for one of said flow or maximum temperature mix of said water to said outlet port; and said limiting member being one piece and splined onto a exterior surface of said mixing valve.

25. In a mixer valve for a faucet having a ball valve pivotably mounted in a valve receiving cavity of a housing, said housing having a plurality of inlet ports and an outlet port in fluid communication with said cavity, said ball valve having a plurality of openings in an outer at least partially spherical valve surface, said openings cooperating with said ports to control water flow through said ports, said valve having a control opening therethrough with an axis of said valve housing passing through said control opening, said ball valve having a control stem extending therefrom and through said control opening with said ball valve being mounted for rotation about said axis of said valve housing and about an axis of said ball valve that is perpendicular to said axis of said housing for control of temperature and flow of water to said outlet port from said inlet ports, said valve housing includes a cap for retaining said ball valve in said valve cavity with said control opening extending through the cap, the improvement characterized by;

a limiting member affixedly and removeably mounted at a fixed position to an exterior portion of said housing in proximity to said cap and having a contoured aperture therethrough with a peripheral edge defining said aperture;

said aperture sized to receive said control stem and allow lateral motion of said stem in at least two transverse directions within said aperture;

said peripheral edges of said aperture defining a limit stop for one of said flow or maximum temperature mix of said water to said outlet port; and said limiting member being one piece and splined onto an exterior surface of an adjustment ring that is operably connected to a seal that abuts said ball valve.

26. In a mixer valve for a faucet having a ball valve pivotably mounted in a valve receiving cavity of a housing, said housing having a plurality of inlet ports and an outlet port in fluid communication with said cavity, said ball valve having a plurality of openings in an outer at least partially spherical valve surface, said openings cooperating with said ports to control water flow through said ports, said valve having a control opening therethrough with an axis of said valve housing passing through said control opening, said ball valve having a control stem extending therefrom and through said control opening with said ball valve being mounted for rotation about said axis of said valve housing and about an axis of said ball valve that is perpendicular to said axis of said housing for control of temperature and flow of water to said outlet port from said inlet ports, said valve housing includes a cap for retaining said ball valve in said valve cavity with said control opening extending through the cap, the improvement characterized by;

a limiting member affixedly and removeably mounted at a fixed position to an exterior portion of said housing in proximity to said cap and having a contoured aperture therethrough with a peripheral edge defining said aperture;

said aperture sized to receive said control stem and allow lateral motion of said stem in at least two transverse directions within said aperture;

said peripheral edges of said aperture defining a limit stop for one of said flow or maximum temperature mix of said water to said outlet port;

said limiting member keyed onto an exterior surface of said mixing valve housing to prevent rotation thereof; and a ring member affixed onto said exterior surface of said mixing valve housing for retaining said limiting member in position on said mixing valve housing.

\* \* \* \* \*